United States Patent
Fogarty et al.

(10) Patent No.: US 6,721,946 B1
(45) Date of Patent: Apr. 13, 2004

(54) METHOD AND SYSTEM FOR INSTALLING SOFTWARE ON A COMPUTER

(75) Inventors: Tom Fogarty, Limerick (IE); Abdelhakeem Amer Hammad, Raheen (IE)

(73) Assignee: Dell Products L.P., Round Rock, TX (US)

( * ) Notice: Subject to any disclaimer, the term of this patent is extended or adjusted under 35 U.S.C. 154(b) by 485 days.

(21) Appl. No.: 09/672,645

(22) Filed: Sep. 28, 2000

(51) Int. Cl.$^7$ .............................................. G06F 9/445
(52) U.S. Cl. ...................................................... 717/175
(58) Field of Search .................................. 717/168–173, 717/174–178, 120–121; 707/104.1; 713/1–2

(56) References Cited

U.S. PATENT DOCUMENTS

| | | | |
|---|---|---|---|
| 5,604,906 A | | 2/1997 | Murphy et al. ............. 717/162 |
| 5,842,024 A | | 11/1998 | Choye et al. ................ 717/178 |
| 5,894,571 A | | 4/1999 | O'Connor |
| 6,080,207 A | * | 6/2000 | Kroening et al. ........... 717/172 |
| 6,092,189 A | * | 7/2000 | Fisher et al. .................... 713/1 |
| 6,117,187 A | * | 9/2000 | Staelin ........................ 717/169 |
| 6,247,128 B1 | * | 6/2001 | Fisher et al. ................ 713/100 |
| 6,385,766 B1 | * | 5/2002 | Doran, Jr. et al. .......... 717/174 |
| 6,523,101 B1 | * | 2/2003 | Nakata ........................ 711/169 |

FOREIGN PATENT DOCUMENTS

GB  2 344 440  6/2000

* cited by examiner

*Primary Examiner*—John Chavis
*Assistant Examiner*—Lawrence Shrader
(74) *Attorney, Agent, or Firm*—Haynes and Boone, LLP

(57) ABSTRACT

A method and system for installing software on a computer in a computer manufacturing facility. In the method, the frequency with which optional hardware and software is installed on a computer is assessed. One or more static installation images are generated for relatively more frequently selected optional hardware or software and one or more dynamic installation images are generated for relatively less frequently selected optional hardware of software. At least one image is then stored in a storage device of a computer. The image database may also contain one or more static/dynamic images. The method and system have particular application in a build-to-order computer manufacturing facility.

17 Claims, 2 Drawing Sheets

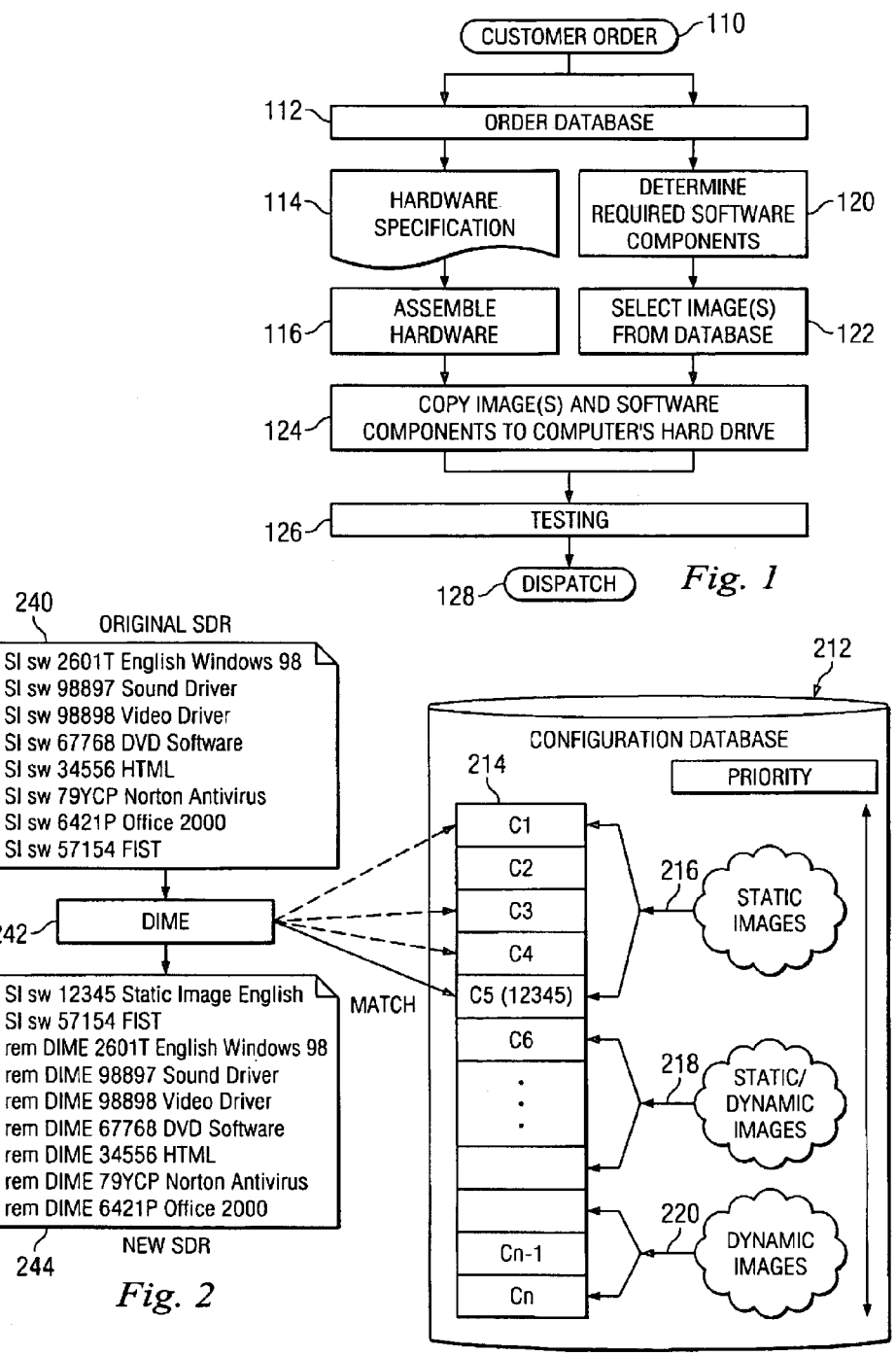

METHOD AND SYSTEM FOR INSTALLING SOFTWARE ON A COMPUTER

This application relates to U.S. patent application Ser. No. 09/467,706 filed on Dec. 20, 1999, entitled APPARATUS AND METHOD FOR CONFIGURING COMPUTERS, naming Pat Condon, Mike Finucane, Maurice Hayes, Patrick O'Grady, Paul Reid, David Speight and John White as inventors. The application is incorporated herein by reference in its entirety, and is assigned to the assignee of the present application.

BACKGROUND

The disclosures herein relate to a method and system for installing software on a computer.

In order to provide customers with a wide choice of computer configurations, some computer manufacturers offer to build computers on a "build-to-order" (BTO) basis. That is to say, a customer can choose form a wide range of optional hardware and software that will be installed on a computer to be manufactured in a batch size of as little as one unit. Typically, a customer may order a BTO computer by making selections from a plurality of menus to specify hardware and software components such as basic system configuration, memory capacity, sound, video and interface cards, disc storage, operating system and application programs. In many cases, a BTO order will be placed by telephone or through a web site.

As will be understood, software must be installed on each computer in accordance with the specification selected by the customer. Such software includes not only the operating system and selected applications, it must also include drivers and other supporting software to operate the hardware that the customer selected. A BTO manufacturing system is likely, therefore, to give rise to an extremely large number of different potential software installations.

In a typical manufacturing installation, a computer's hardware is assembled and the assembled computer is loaded into a burn rack. The burn rack then copies ("burns") the software required for the computer onto its hard drive (or other storage device). The total time taken to copy the software to the computer is referred to as the "burn time". After the copying is complete, the computer may be subjected to a configuration and test procedure on the burn rack, possibly by means of executing software copied onto the hard drive during the burn.

Previously, many manufacturers have adopted a technique known as layering to copy the software ordered by the customer onto the computer's hard drive. All of the software components (OS, drivers, applications, and so forth) are copied onto the drive in units suitable for distribution. When the customer first starts their machine, the various components are installed from the copied units such that they are configured for use. Typically, the first component to be installed is the OS, followed by the device drivers, followed by the applications. Thus, the system's software is built up in much the same manner as in a manual installation.

Problems associated with a layered system are well-recognized. These are primarily due to the complexity of the procedure that must be carried out when the customer first tries to use their computer. This procedure is liable to failure (either as a result of inadvisable actions on the part of the customer or inherent problems) and the time taken for the procedure to complete is often perceived by the customer as being an inconvenience. For the manufacturer, each failure of a new computer typically results in intervention by customer support personnel and possible return of the computer, both of which represent an increase in the total cost associated with manufacturing the computer, together with a loss of customer satisfaction.

In order to address these difficulties, it is also known to install software on a computer by copying an image onto the hard drive. A first type of image, known as a static image, contains what is essentially a snapshot of the contents of a computer's hard drive after all of the required software has been installed. The customer is therefore presented with a computer that is ready for use (perhaps after a small amount of configuration or manual input) without any major installation procedure or significant delay. It is also the case that the burn time for installation of a static image onto a new computer system occupies considerably less than the burn time of an equivalent system built up by layering.

As discussed above, the content of a computer's hard drive is dependent to a great extent upon the hardware and software that is installed on the computer. Where computers are to be built on a BTO basis, a manufacturer would require an unfeasibly large number of different images to accommodate the full range of hardware and software options offered to a user. This problem is addressed by the provision of dynamic images. A dynamic image requires that a configuration procedure be carried out when the computer is first operated. Configuration may take place either under automatic control (for example, by means of a script file contained in the image) or manual control, to tailor the final configuration of the computer to the customer's specific requirements and the installed hardware. It may contain several versions of some files, suitable for different hardware, operating system or application software configurations, thus increasing its size. Although it is more versatile than a static image, a dynamic image is more difficult for a manufacturer to produce, and its burn time is greater than the burn time of an equivalent static image.

Therefore, what is needed is a system and a method to enable computer systems to be produced on a BTO basis, while taking advantage of the improved reliability and convenience offered by an image-based installation, while optimizing the required burn time, and also to maximize the throughput of a computer manufacturing facility.

SUMMARY

One embodiment, accordingly provides a method for installing software on a computer in a computer manufacturing facility including, assessing the frequency with which optional hardware and software is selected for installation on a computer; generating at least one static installation image for relatively more frequently selected optional hardware and software and generating at least one dynamic installation image for relatively less frequently selected optional hardware and software, and storing at least one image in a storage device of a computer.

BRIEF DESCRIPTION OF THE DRAWINGS

FIG. 1 is a flow diagram illustrating an embodiment of steps in the construction of a computer in a build-to-order manufacturing facility.

FIG. 2 is a block diagram that represents an embodiment of operation of a system.

DETAILED DESCRIPTION

Figure 3:
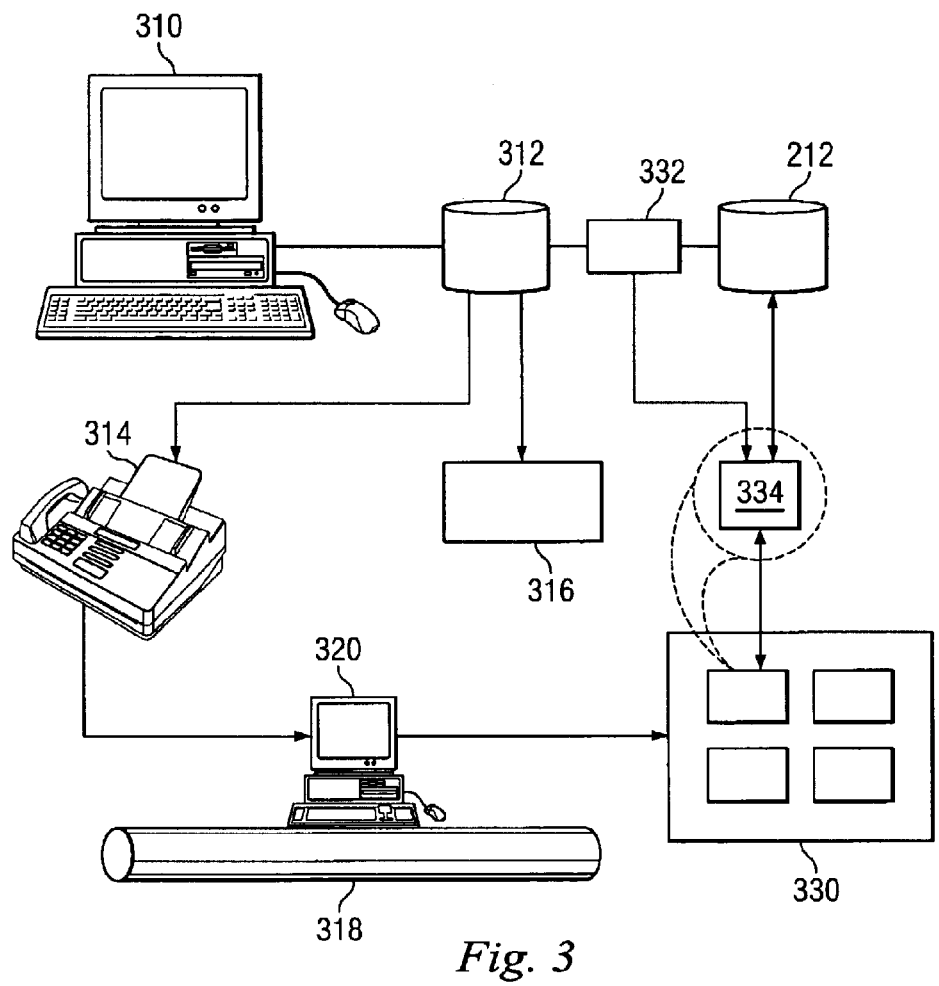
FIG. 3 is a highly diagrammatic representation of an embodiment of components of a computer manufacturing facility.

With reference to FIGS. 1 to 3, the steps required to construct a computer in a BTO computer manufacturing facility incorporating a method of embodying the disclosures herein will now be described.

In order to gain an advantage, a computer manufacturer must analyze the frequency with which configurations of hardware and software are requested by customers, and build an image database 212 of software images 214, to support the range of optional hardware and software offered. The images in the database are of three types: static, static/dynamic and dynamic (indicated, respectively, at 216, 218 and 220 in FIG. 2).

Each image 214 within the database 212 is assigned a search priority that indicates the order of preference in which they will be selected for use. Most usually, an image will be assigned a priority that relates to its burn time; the shorter the burn time the higher the priority.

In general, the cost and time taken to develop a static image is comparatively less, in comparison to the cost and time to develop a dynamic image. Moreover, the range of configurations to which a static image can be applied is less than is the case with a dynamic image. However, for each computer to be manufactured, the burn time to install a static image is less than that for a dynamic image. In respect of both its burn time and its development time, a static/dynamic image lies between a static image and a dynamic image. In deciding which type of image will be used, a manufacturer will refer to the results of its analysis, and offset the time and cost involved in creating the images against the ongoing time and cost of burning the images onto computers that are manufactured in the manufacturing facility.

Construction of a computer in a BTO environment is initiated by a customer placing an order (Step 110), for example, from their own computer 310 interacting with the manufacturer's web site. The order specifies in detail the hardware and software options that the customer has selected. Details of the order are stored in an order database 312 (Step 112).

The order is then handed on to the manufacturing facility. In order to assemble the required hardware, a human-readable hardware specification sheet 314 is generated by the order database 312 (Step 114). The specification sheet 314 lists all of the hardware components that are required in order to meet the customer's specification. Within the manufacturing facility, an operator on a hardware assembly line 318 assembles (Step 116) all of the items listed on the specification sheet 314 to create a complete computer 320 that fulfils the customer's hardware specification.

Once the hardware is assembled, the complete computer is transferred to a burn rack 330 where the software will be installed onto the computer's hard drive (or other mass-storage device).

Within the manufacturing facility, the software for the computer is also assembled. This is typically done in parallel with assembly of the hardware in order to minimize the amount of time spent in the manufacturing facility. Assembly of the software will now be described.

The first step in assembly of the software is to compile a list of software components to be installed (Step 120). This is done with reference to the order stored in the order database 312 by analyzing the customer's specification and compiling a list of software components required. The list of software components will typically include several of the following components; an operating system (OS), device drivers for the hardware specified by the customer, application programs specified by the customer, and software for testing the computer prior to its dispatch to the customer. (The analysis is most typically carried out by a computer system.) The compiled list (illustrated at 240 in FIG. 2) is stored as a computer file and contains data sufficient to identify all of the software that need be loaded onto the computer as software components in order that the computer will meet the customer's specification.

The compiled list 240 is then analyzed by an image management engine 242 to select images for the burn process. The image management engine 242 is constituted by a software system executing on suitable computer hardware 332.

The image management engine 242 now caries out a search in the image database 212 (Step 122). Starting with the image 214 of highest priority (typically a static image), the image management engine 242 compares the contents of the image with the contents of the compiled list 240. If all items in the image 214 are matched with items in the list, then the matched items are removed from the list 240 and replaced with a reference to the image 214. In this embodiment, just one image is selected for each computer, with any remaining software being derived from individual components. However, in alternative embodiments, this step may be repeated until either all of the items in the list 240 have been replaced, or all of the images 214 in the database 212 have been compared, whereupon the matching process is terminated. The matching process thus creates a processed list 244, constituted by a computer file, that enumerates an image, and in some cases, one or more layering components which are to be used to implement the customer's software specification.

The assembled computer hardware is mounted on a burn rack. The computer is then started, and boots a software loading program 334, either from a drive within the computer (e.g. a floppy disc drive) or from a network connection on the burn rack.

The software loading program 334 reads the processed list 244. The software loading program 334 downloads and extracts the image and each software component in the processed list 244 from the image database 212 and copies it onto the computer's hard drive. For each of the image and the software components copied, the software loading program 334 executes any associated configuration script to set up the software, if required. In general, a static image will only need to be expanded and copied onto the computer's hard drive. A static/dynamic or a dynamic image will also have to be configured by the software loading program causing the image's configuration script to be executed. All other components will generally be provided with a configuration script that the software loading program 334 will execute. Once all of the software is copied and configured as required, the computer is tested (Step 126). If the tests are successful, the computer can be removed from the burn rack 330 and dispatched to the customer (Step 128).

Consider first a computer for which a customer has specified a highly unusual combination of optional hardware and software components. It may be that the image match found in the database 212 can provide only a minimal number of software components (for example, the operating system alone) and the processed list 244 is almost identical to the compiled list. Such a configuration will require a long burn time. However, if the original analysis of the frequency with which hardware and software options are selected was carried out proficiently, it is likely that this will be a comparatively rare occurrence, and will have little impact on the total efficiency of the manufacturing installation.

If, on the other hand, the customer specifies a system that is commonly selected, it may be that a match is found early in the search of the database that includes all or most of the components in the list 240. Such a configuration may result in all of the software required for a computer being contained within a static image and a small number (possibly zero) of other components, with the result that the burn time required will be short. Because the configuration is common, it is likely that many computers processed by the manufacturing installation will be installed in this way.

As an intermediate case, consider for example, a computer for which a user has specified options that are for the most part common, but has a small number of less common hardware or software options. When the database 212 is searched, it may be that a static/dynamic image will be found that will provide the common options selected by the customer when properly configured. This will leave some software items in the list 240 to be provided as individual layering components. It will be seen that this system is likely to require a burn time that is somewhere between the extreme cases described in the last two preceding paragraphs.

The content of the database 212 is not constant over time. If analysis of the computers produced by the manufacturing installation reveals that a configuration that is based on static/dynamic or dynamic images is becoming more commonly specified, a decision can be taken to develop a static image (or a static/dynamic image) to implement that configuration. In reaching the decision, the time and effort involved in creating the new images is offset by an increase in the performance of the manufacturing installation as a whole. To implement this aspect of the embodiments herein, a computer system 316 may be provided that analyzes orders stored in the order database 312 to generate a report that makes recommendations to operators of the system as to which images should be changed in order to optimize performance of the manufacturing facility.

Consider that a certain configuration of computer is derived from a static/dynamic image with a burn time of 48 minutes. Now, it is observed that the take rate of that configuration significantly increases from 5% to 18% of a production line's output in any given month. Then a static image could be developed and modifications made to the database 212 to implement the configuration as a fast static image, which has a burn time of 22 minutes That is, the static image results in a burn time that is 26 minutes faster than the corresponding static/dynamic image. So in future, the same configuration will use the new static image not the slower static/dynamic image used before. The advantages include:

Total monthly output in units of a manufacturing line: 150,000

18% of the line's monthly output in units: 27,000

Time saved in burn racks per month: 27,000*26=702,000 minutes=11,700 hours

While the above discussion relates to reconfiguration of the database as a result of analyzing the past output of a manufacturing facility, a similar adjustment can be made in advance of a forthcoming change. Consider what might happen if a manufacturer receives a big order from one very large customer, that requires say 10,000 systems as soon as possible, all with the same configuration. If this particular configuration was not previously particularly common, it might be assigned to a slow image (dynamic or normal layering process). However, a much faster static image could be developed before starting to manufacture a batch of computers to fulfill the order, and the database would be modified accordingly. Therefore, the configuration for the order of computers would be derived from a faster image. As a result, that order will run through the burn racks faster than would be the case if the modification were not made. If the use of a faster image saves a burn time of say 20 minutes per unit, the time saved will be 10,000 (20)=200,000 minutes or 3333 hours. It may be found necessary to construct one or more static images to enable the manufacturing facility to complete the order within a delivery deadline specified by the customer.

Although illustrative embodiments have been shown and described, a wide range of modification, change and substitution is contemplated in the foregoing disclosure and, in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method for installing software on a computer in a computer manufacturing facility comprising:

assessing a frequency with which optional hardware and software is installed on a computer;

generating a static installation image for a first most frequently selected optional hardware and software, generating a static/dynamic installation image for a second most frequently selected optional hardware and software and generating a dynamic installation image for a third most frequently selected optional hardware and software, the images being developed for a configuration database for use in determining a most appropriate image for an actual configuration ordered by a customer; and storing at least one image in a storage device of the computer.

2. A method according to claim 1 in which the software installed on the computer includes software components required to support optional hardware installed on the computer.

3. A method according to claim 1 in which the assessing is carried out on the basis of historical data obtained by analyzing previously constructed computers.

4. A method according to claim 1 in which the assessing and the generating are repeated from time to time during production of computers.

5. A method according to claim 1 in which the assessing is carried out on the basis of optional hardware and software expected to be installed in future.

6. A method according to claim 5 in which a static image for installation of all or a substantial part of the software for a configuration is generated in advance of installation of software onto a large number of computers according to that configuration.

7. A method according to claim 1 in which each image is assigned a priority, images of a higher priority being selected in preference to those of a lower priority.

8. A method according to claim 1 including generating a software description that lists items of software to be installed on a computer, and selecting from the database one or more images to implement each item in the software description.

9. A method according to claim 1, further comprising:

receiving from a customer, an order for a build-to-order computer;

assembling hardware in order to build a computer that fulfils a hardware specification contained in the order; and installing software on the computer.

10. A system for installing software on a computer in a computer manufacturing facility comprising:

an image database including a static installation image for a first most frequently selected optional hardware and software, a static/dynamic installation image for a second most frequently selected optional hardware and software and a dynamic installation image for a third most frequently selected optional hardware and software, the images being developed for the database for use in determining a most appropriate image for an actual configuration ordered by a customer;

an analysis system for analyzing a specification for a computer and selecting images from the image database to implement the specification; and a copying system for copying the images selected by the analysis system to a storage device of a computer.

11. A system according to claim 10 including an order processing system for receiving the customer's order and generating a hardware and software specification therefrom.

12. A system according to claim 10 comprising an analyzer for analyzing the frequency with which optional hardware and software is specified in the customer's orders.

13. A system according to claim 11 in which the analyzer is operable to assess benefits attained through amendment to the image database based upon analysis of the customer's orders.

14. A system according to claim 10 in which the copying system is a burn rack of a computer manufacturing facility.

15. A system according to claim 10 further comprising a selector for selecting from the image database, images to be copied by the copying system.

16. A system according to claim 14 in which the selector includes a software engine capable of analyzing the content of the customer's order and of the image database.

17. A system according to claim 14 in which the images in the image database are assigned a priority to indicate to the selector which images are to be selected.

* * * * *